United States Patent
Kwak et al.

(10) Patent No.: US 11,703,232 B2
(45) Date of Patent: Jul. 18, 2023

(54) HEATING PANEL AND ITS MANUFACTURING METHOD

(71) Applicant: HOYAHOMETECH CO., LTD, Gunsan-si (KR)

(72) Inventors: Soo-hwan Kwak, Seoul (KR); Jin-chul Park, Seoul (KR); Hae-sung Hwang, Seoul (KR)

(73) Assignee: HOYAHOMETECH CO., LTD, Gunsan-si (KR)

( * ) Notice: Subject to any disclaimer, the term of this patent is extended or adjusted under 35 U.S.C. 154(b) by 0 days.

(21) Appl. No.: 17/824,150

(22) Filed: May 25, 2022

(65) Prior Publication Data
US 2022/0357052 A1    Nov. 10, 2022

Related U.S. Application Data (63) Continuation of application No. PCT/KR2022/002625, filed on Feb. 23, 2022.

(30) Foreign Application Priority Data

May 4, 2021    (KR) .......................... 10-2021-0057663

(51) Int. Cl.
*F24D 3/16*    (2006.01)
*F24D 3/12*    (2006.01)
(Continued)

(52) U.S. Cl.
CPC .............. *F24D 3/16* (2013.01); *F24D 3/127* (2013.01); *F24H 9/0063* (2013.01); *F28F 3/048* (2013.01);
(Continued)

(58) Field of Classification Search
CPC . F24D 3/12; F24D 3/127; F24D 3/148; F24D 3/149; F24D 3/16; F24H 9/0063;
(Continued)

(56) References Cited

U.S. PATENT DOCUMENTS 5,536,345 A      7/1996  Lingart
10,928,075 B1 *  2/2021  Warneke ................. F24D 3/142
(Continued)

FOREIGN PATENT DOCUMENTS

GB    2568614 A  *  5/2019  ............. F24D 3/127
GB    2574638 A  * 12/2019  ............... E04B 5/48
(Continued)

*Primary Examiner* — Eric S Ruppert
*Assistant Examiner* — Hans R Weiland
(74) *Attorney, Agent, or Firm* — NKL Law; Jae Youn Kim (57) ABSTRACT

A heating panel includes a lower panel mounted on the floor and an upper panel serving as a cover of the lower panel. The lower panel includes: a plurality of first guides protruding upward from the bottom surface to guide installation of a heating hose; and a first air passage formed as a groove on the bottom surface and the surface of the first guide, and further includes a plurality of second guides protruding upward from the bottom surface, having the first air passage on the surface thereof, and disposed between the plurality of first guides to guide installation of the heating hose. The upper panel is coupled to the lower panel and includes: a second air passage formed on the bottom surface in a groove form; and a second fastening member coupled with the first fastening member.

16 Claims, 7 Drawing Sheets

(51) Int. Cl.
   *F28F 21/02*  (2006.01)
   *F28F 3/04*   (2006.01)
   *F24H 9/00*   (2022.01)
(52) U.S. Cl.
   CPC .......... *F28F 21/02* (2013.01); *F28F 2255/06* (2013.01); *F28F 2255/143* (2013.01); *F28F 2255/16* (2013.01)
(58) Field of Classification Search
   CPC .. F28F 21/02; F28F 2255/06; F28F 2255/143; F28F 2255/16; F28F 3/048
   See application file for complete search history.

(56) References Cited

U.S. PATENT DOCUMENTS

| | | | |
|---|---|---|---|
| 2004/0074631 A1* | 4/2004 | Jeon | F24D 3/148 165/47 |
| 2016/0010875 A1* | 1/2016 | Cho | F24D 3/12 237/69 |

FOREIGN PATENT DOCUMENTS

| | | | |
|---|---|---|---|
| KR | 200195437 Y1 * | 9/2000 | |
| KR | 20-2008-0004185 U | 9/2008 | |
| KR | 10-0917236 B1 | 9/2009 | |
| KR | 101267516 B1 * | 5/2013 | |
| KR | 10-2016-0017465 A | 2/2016 | |
| KR | 10-2035669 B1 | 10/2019 | |
| WO | WO-2015088165 A1 * | 6/2015 | ............ F24D 13/024 |

* cited by examiner

HEATING PANEL AND ITS MANUFACTURING METHOD

CROSS-REFERENCE TO RELATED APPLICATIONS

This application is a continuation of PCT/KR2022/002625, filed on Feb. 23, 2022, which claims priority to KR10-2021-0057663, filed on May 4, 2021, the entire disclosure of which is incorporated herein by reference.

TECHNICAL FIELD

The present invention relates to a heating panel, and more specifically, to a heating panel, which is simple in structure, is easy to construct, and is excellent at thermal conductivity, heat storage capacity, and flame retardancy using carbon composites, and a manufacturing method of the heating panel.

BACKGROUND ART

Houses in Korea have taken a floor heating system of a radiant heat type by the Ondol structure. However, in the modern age, a new dry floor heating system which improves problems of the existing wet floor heating system has been expanding. A wet heating method is a wet construction method applying autoclaved light weight concrete, hot water piping, mortar, and the like on a reinforced concrete slab, and has disadvantages in that it is complicated, is difficult to secure quality and manage site, and it takes lots of time to cure concrete and mortar. In a dry heating method, a hot water pipe and an insulator are embedded in a hot-water Ondol panel. So, the dry heating method has several advantages in that it can be used directly after construction and reduce construction costs due to reduction of a construction period since it does not need time to cure concrete, which is a disadvantage of the wet heating method. Furthermore, the wet heating method has another disadvantage in that heating costs increases since heat escapes to a concrete floor and thermal efficiency is decreased. A dry hot-water Ondol method has an effect of reducing heating costs by increasing thermal efficiency with construction of floor insulators using thermal conductivity of panels. However, the conventional dry heating panel has a disadvantage in that it deteriorates heating effect and is vulnerable to fire due to minor strength, sloshing of the floor, and low thermal conductivity since using poly-based resin. In order to solve this problem, a metal sheet is used on the upper plate to secure thermal conductivity, but the heat storage capacity is low so that the heat control function is lowered and the indoor air is dried.

In order to supplement the vulnerability of the general poly-based resin, researches have been actively carried out to provide various functions, such as thermal conductivity, heat storage capacity, flame retardancy, etc., to general construction materials as well as heating materials. For example, it is possible to produce multifunctional carbon-polymer composites having excellent strength, thermal conductivity, heat storage capacity, flame retardancy, and so on by compounding inorganic materials, polymer resin, and carbon materials, such as graphite, expanded graphite, carbon fiber, activated carbon, carbon nanotube, graphene, carbon black, etc. Accordingly, it is necessary to develop eco-friendly heating panels to which such materials are applied so as to make construction easy, have highly thermal conductivity, heat storage capacity, and flame retardancy.

DISCLOSURE

Technical Problem

Accordingly, the present disclosure has been made to solve the above-mentioned problems occurring in the prior art, and it is an object to provide an eco-friendly heating panel, which does not need metallic heat sinks and has thermal conductivity, heat storage capacity, and flame retardancy by mixing carbon materials and various organic and inorganic materials to polymer resin, and a manufacturing method of the heating panel.

Technical Solution

To accomplish the above-mentioned objects, according to the present invention, there is provided a heating panel including a lower panel having a plurality of first guides protruding upward from the bottom surface to form a passage of a heating hose and a first air passage formed on the bottom surface and the surface of the first guide.

The heating panel further includes a plurality of second guides protruding upward from the bottom surface, having the first air passage on the surface thereof, and disposed between the plurality of first guides to guide installation of the heating hose.

Moreover, the lower panel includes a first connection member formed in a square and formed to have protrusions on two side surfaces of the square, and a second connection member formed on the rest two side surfaces of the square to be coupled with the first connection member, such that a plurality of the heating panels can be coupled with one another. Furthermore, the first guide includes a hose fixing member which protrudes at a position getting in contact with the heating hose to fix the heating hose. The center of the first guide is formed in a circular or oval shape, and four sides are formed in a semicircular or semioval shape.

The lower panel further includes a first cut groove for dividing the panel into two or four parts, and a hose fixing member disposed at a predetermined position of the first guide to be fastened to the upper panel. Additionally, the heating panel further includes a first fastening member extending to the bottom surface of the lower panel in a columnar shape to support a load, and a screw-coupling hole formed on the bottom of the first fastening member. The first guide part, which protrudes upward, is formed concavely on the bottom surface of the lower panel, and the lower panel further includes a cross-shaped load supporting member formed around the first fastening member.

The heating panel further includes an upper panel coupled to the lower panel and including: a second air passage formed on the bottom surface in a groove form; and a second fastening member coupled with the hose fixing member. The upper panel further includes a second cut groove for dividing the upper panel into two or four parts.

The heating panel is made of a carbon composite material composed of 50 to 52 wt % of thermoplastic resin, 25 to 30 wt % of a carbon material, 22 to 26 wt % of an inorganic material, and 5 to 8 wt % of maleic anhydride polypropylene (MAPP).

The thermoplastic resin is one or more selected from polypropylene, polycarbonate, and polyethylene resin. The carbon material is one or more selected from graphite, expanded graphite, carbon fiber, activated carbon, carbon nanotube, graphene, and carbon black. The inorganic material is one or more selected from elvan, gelite, and illite.

In another aspect of the present invention, there is provided a manufacturing method of a heating panel including the steps of: mixing thermoplastic resin, a carbon material, an inorganic material, and maleic anhydride polypropylene (MAPP); melting the mixture at 130° C. to 230° C.; adding carbon powder to the mixture; extruding, cooling and cutting the mixture to prepare pellets; and heating and injection-molding the pellets to form a heating panel.

Advantageous Effects

According to the present invention, the heating panel which is manufactured by using carbon composite materials can provide excellent heating efficiency without any thermal conductive medium since having excellent thermal conductivity and heat storage capacity, improve safety from fire as a flame retardant material, and withstand a heavy load due to excellent strength. In addition, the heating panel according to the present invention is easy to construct since having a simple structure.

MODE FOR INVENTION

Hereinafter, embodiments of the present invention will be described in detail with reference to the attached drawings. In the description of the present invention, when it is judged that detailed descriptions of known functions or structures related with the present invention may make the essential points vague, the detailed descriptions of the known functions or structures will be omitted.

Figure 1:
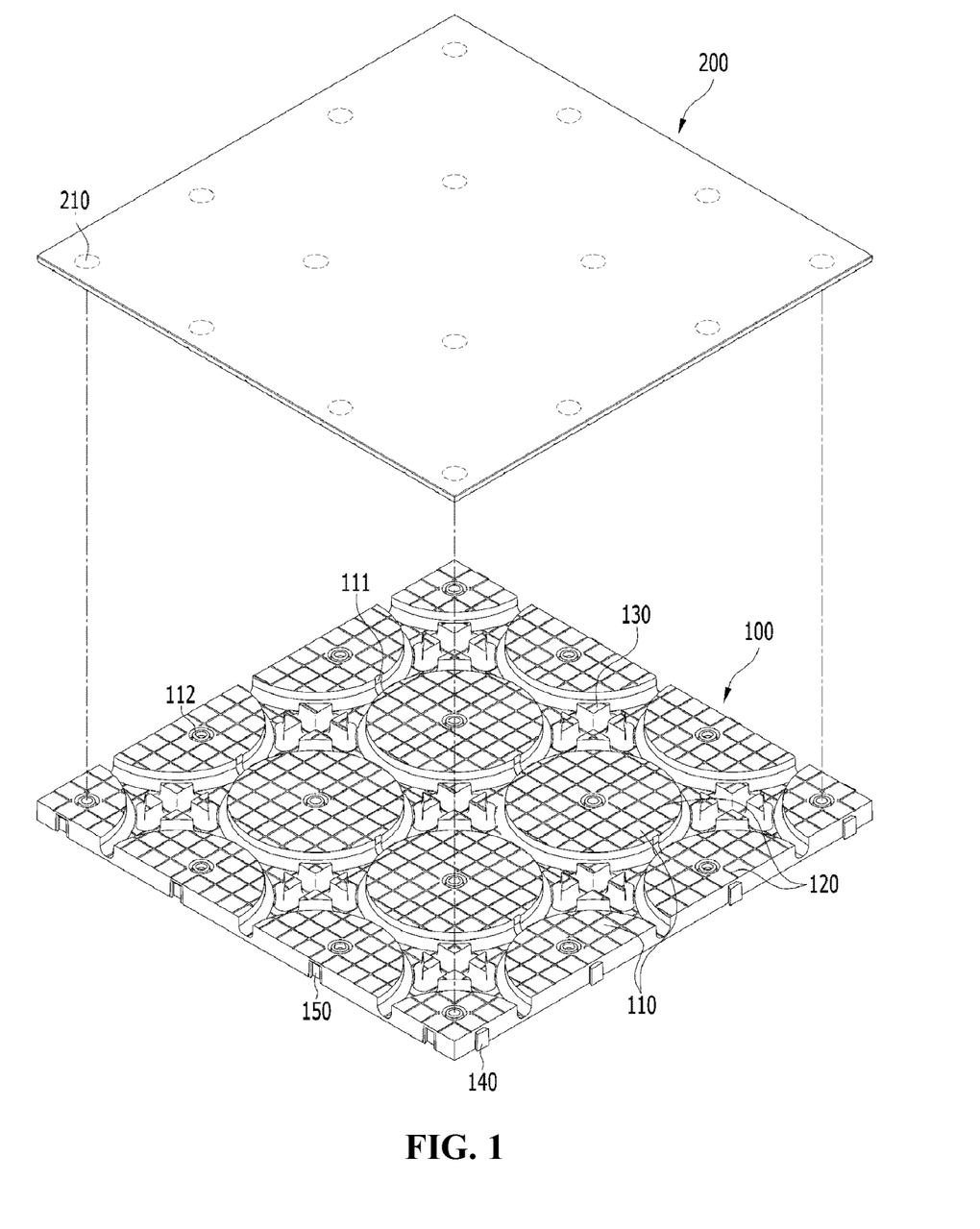
FIG. 1 is a view illustrating a lower panel 100 and an upper panel 200 of a heating panel according to the present invention.
Figure 2:
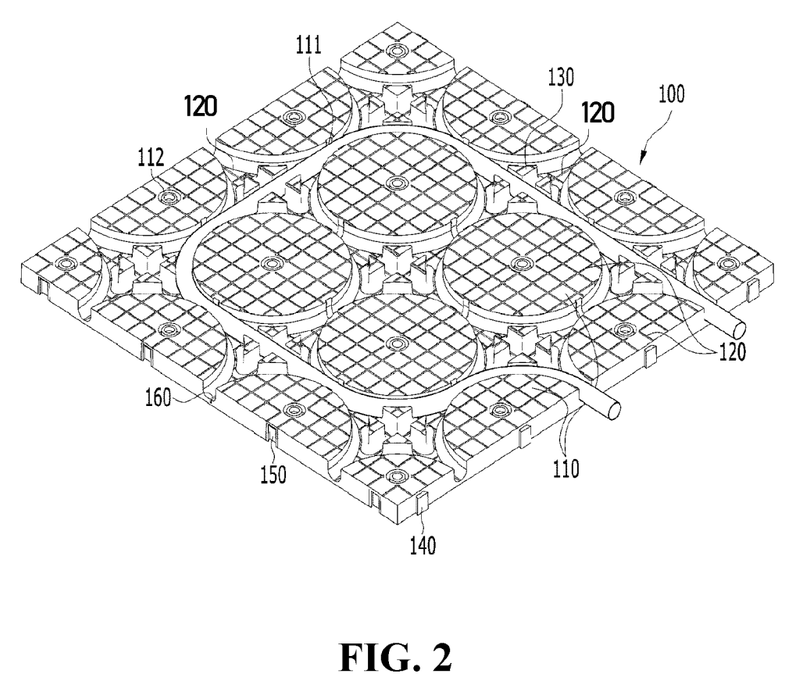
FIG. 2 is a view illustrating the lower panel 100 according to a first embodiment of the present invention.
Figure 3:
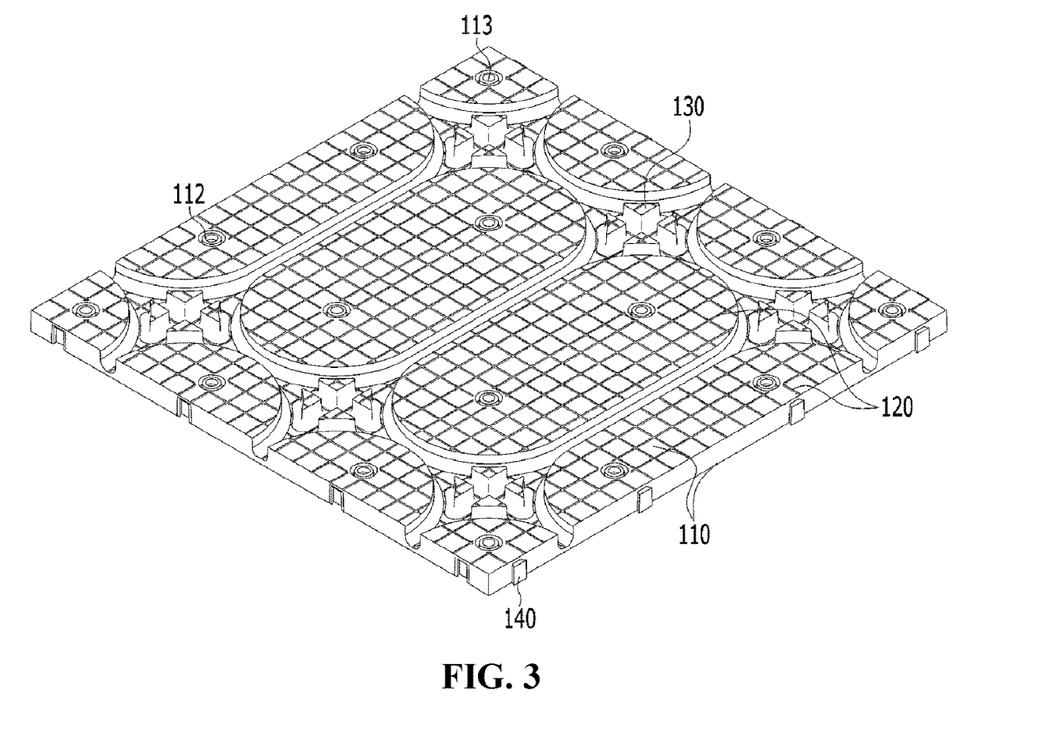
FIG. 3 is a view illustrating the lower panel 100 according to a second embodiment of the present invention.
Figure 4:
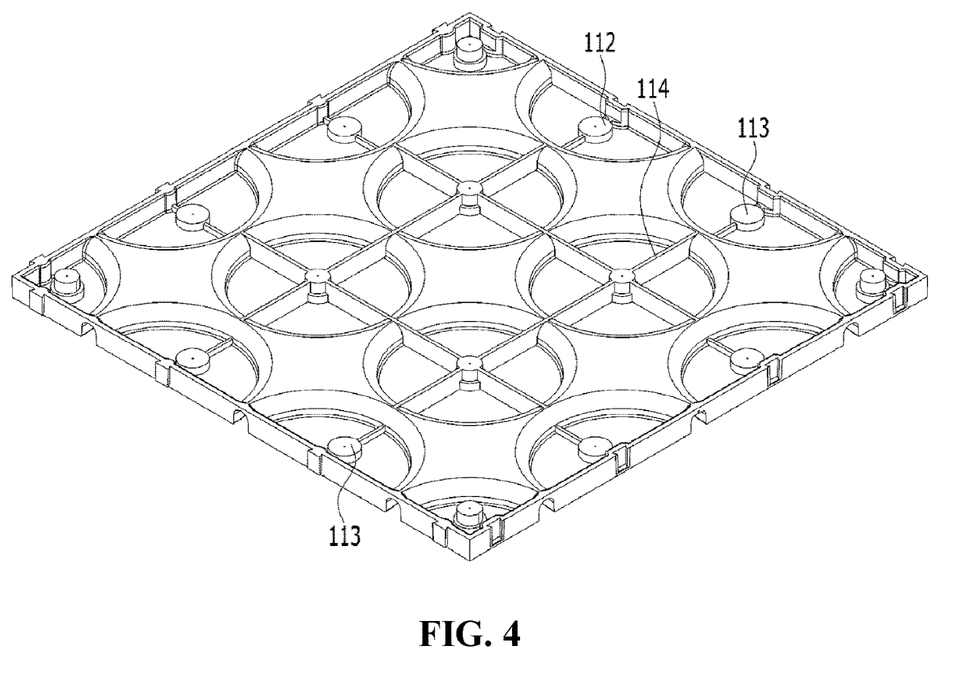
FIG. 4 is a view illustrating the lower surface of the lower panel 100.
Figure 5:
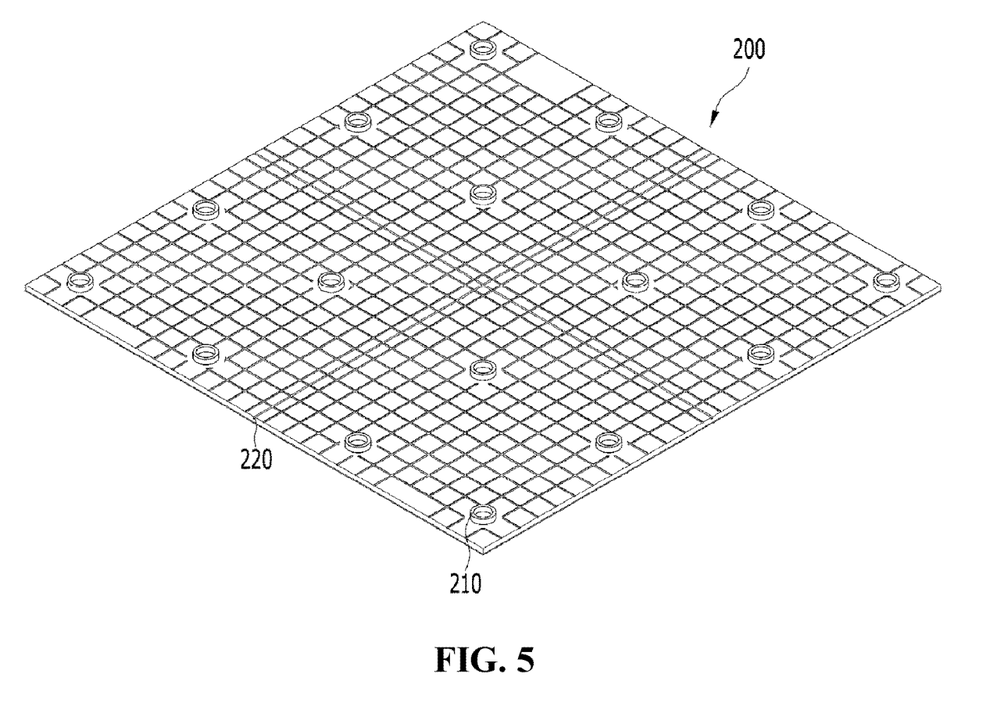
FIG. 5 is a view illustrating the upper panel 200.
Figure 6:
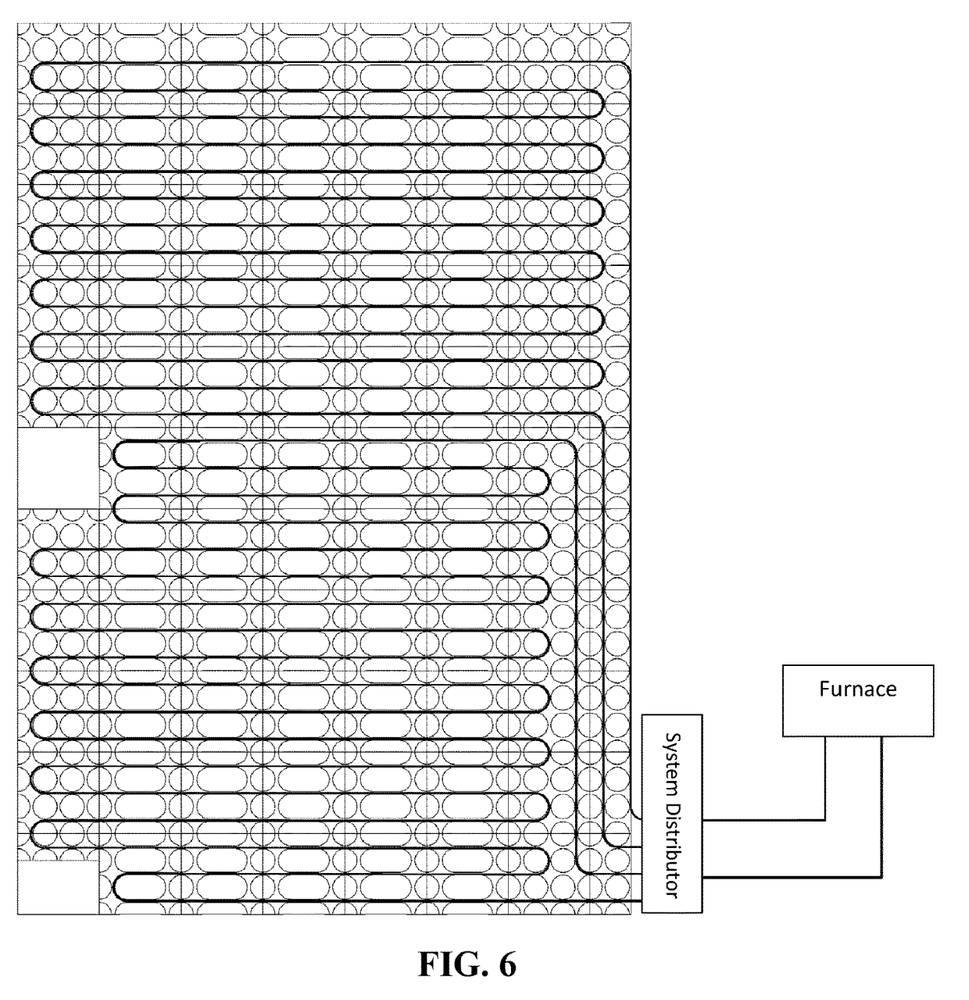
FIG. 6 is a view illustrating a state where the heating panel according to the present invention is constructed.
Figure 7:
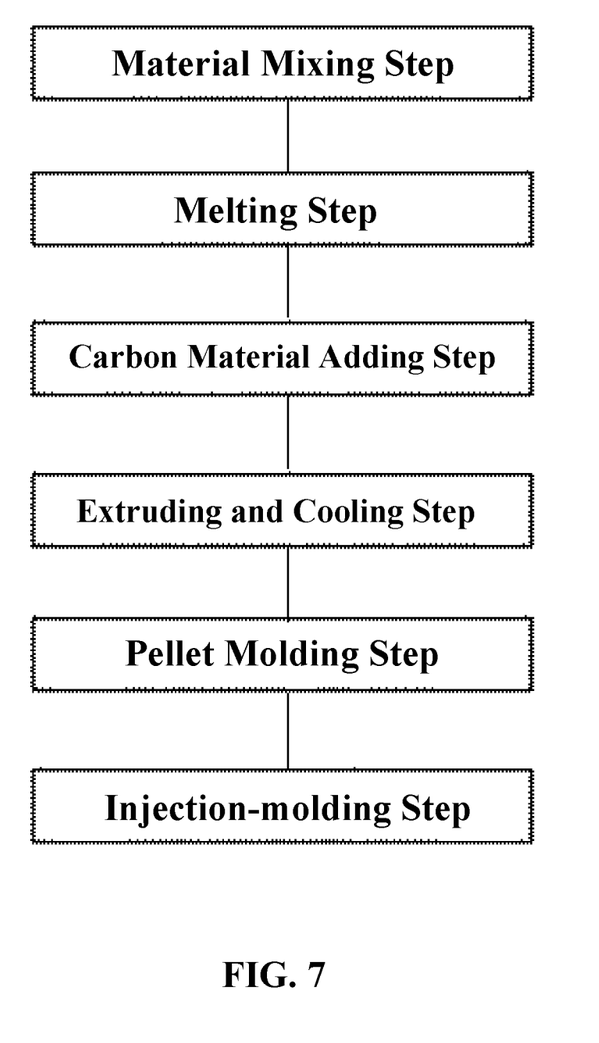
FIG. 7 is a view illustrating a manufacturing method of the heating panel according to the present invention.

FIG. 1 is a view illustrating a lower panel 100 and an upper panel 200 of a heating panel according to the present invention. FIG. 2 is a view illustrating the lower panel 100 according to a first embodiment of the present invention. FIG. 3 is a view illustrating the lower panel 100 according to a second embodiment of the present invention. FIG. 4 is a view illustrating the lower surface of the lower panel 100. FIG. 5 is a view illustrating the upper panel 200. FIG. 6 is a view illustrating a state where the heating panel according to the present invention is constructed. FIG. 7 is a view illustrating a manufacturing method of the heating panel according to the present invention.

The heating panel according to an embodiment of the present invention includes: a lower panel 100 mounted on the floor or the wall of a building to put a hot water hose or a cold water hose thereon; and an upper panel 200 coupled to the lower panel 100 to serve as a cover.

The lower panel 100 includes first guides 110, first air passages 120, second guides 130, and hose fixing members 111 disposed on the upper surface thereof, includes first connection members 140 and second connection members 150 disposed on the side surface to be connected to another lower panel 100, and further includes a member formed concavely at a portion of the bottom surface corresponding to the first guide 110 so as to support a load. Hereinafter, the configuration of the lower panel 100 will be described.

The lower panel 100 is installed on a surface for heating, and is generally installed on the floor, but may be installed on the wall surface or the ceiling according to sites. For convenience of description, the present invention is described with reference to being installed on the floor. In dry heating, the heating panel performs heating after the lower panel 100 is installed on the floor and a hot water hose is mounted on the lower panel. The heating panel is mainly used for heating but may be used for floor cooling by passing cold water.

The lower panel 100 is formed in a square. It is important to arrange hot water hoses at desired positions at regular intervals since the lower panel 100 serves to put the hot water hoses. The first guides 110 disposed on the lower panel 100 are configured to put the hot water hose for heating at a desired position. The first guide 110 protrudes upward from the bottom surface of the lower panel 100 in a circular or oval shape, and a space for putting the hot water hose is formed in a passage formed between the plurality of first guides. The hot water hose is seated between the first guides in a straight section and is seated to surround the first guides in a curved section. As illustrated in FIGS. 2 and 5, in order to seat the hot water hose on the lower panel 100 and heat the entire floor, the hot water hose must be seated on the lower panel 100 and bent at several portions of the lower panel while surrounding the first guides 110. Therefore, preferably, the first guide 110 is formed in a circular or oval shape so that the hot water hose is not bent. The first guide 110 may be formed in a circular or oval shape at the central portion of the lower panel 100 and formed in a semicircular shape or semioval shape at four side surfaces. The first guides formed in the semicircular shape or semioval shape at the side surfaces can maintain the circular or oval shape even though being coupled with a plurality of the lower panels 100 as illustrated in FIG. 5 so as to uniformly maintain intervals of the hot water hose. The present invention can heat a wider area more uniformly since the hot water hose can be mounted to be closest to the wall surface.

A hose fixing member 111 can be provided at a portion of the first guide 110 where the hot water hose is bent. The hose fixing member protrudes to a horizontal plane of the upper surface from the side surface where the hot water hose of the first guide 110 is bent so as to serve to fix the hot water hose not to protrude above the surface of the first guide 110.

Additionally, a first fastening member 112 is formed at a predetermined position of the first guide 110 to be coupled to the upper panel 200, which will be described later. The first fastening member 112 is a member to be coupled to a second fastening member of the upper panel 200 to stably couple the upper panel 200 serving as a cover of the lower panel 100. The first fastening member 112 can be formed in a circular or polygonal shape and includes a male fastening member or a female fastening member corresponding to the second fastening member. The height of the first fastening member 112 is preferably formed to be horizontal to the upper surface of the first guide 110 so that there is no space between the lower panel 100 and the upper panel 200 when the lower panel is coupled with the upper panel 200. In addition, as illustrated in FIG. 4, the lower surface of the first fastening member 112 extends to the bottom surface of the lower panel 100 to support the load applied to the heating panel according to the present invention.

A screw-coupling hole 113 may be provided at a central portion of the first fastening member 112. The screw-coupling hole 113 is screw-coupled to the floor surface by using a screw when it is necessary to firmly fasten the lower panel to the floor surface. The screw-coupling hole 113 can play an important role when the screw-coupling hole 113 is coupled to the wall surface or the ceiling rather than the floor surface.

Next, the first air passage 120 will be described. The heating panel according to the present invention includes the lower panel 100 and the upper panel 200 and performs heating by covering the upper panel 200 on the lower panel 100 installed on the floor surface. In this instance, in order to firmly construct the heating panel, the lower panel 100 and the upper panel 200 are preferably in close contact with each other. In this instance, since there is no space between the lower panel 100 and the upper panel 200, heat generated from the hot water hose may not be sufficiently transferred to the entire panel. The first air passage 120 is provided to solve the above problem, and is formed by a shallow groove formed on the bottom surface of the lower panel 100, the first guide 110, and the second guide 130, that is, on the entire surface of the lower panel 100. The first air passage 120 is preferably a groove of a lattice pattern formed for more efficient heat transfer. The first air passage 120 is preferably configured to correspond to the position of a second air passage 210 of the upper panel 200, which will be described later, so that warm air can be circulated more smoothly.

Next, the second guide 130 will be described.

The second guide 130 protrudes from the bottom surface with the same height as the first guide 110 between the plurality of first guides 110. The second guide 130 serves to fix the hot water hose at both sides when the hot water hose passes between the first guides 110 in a straight line, and serves to support the hot water hose from the outside of the first guides 110 when passing while surrounding the first guides 110. The second guide 130 is formed in a cross shape at a passage portion so as to fix the hot water hose even though the hot water hose comes from any direction.

The present invention requires a configuration to couple the plurality of lower panels 100 which are installed on the floor for heating construction performed by connecting lots of panels. Therefore, the lower panel 100 includes the first connection member 140 and the second connection member 150 disposed on the side surface thereof. Two first connection members 140 respectively having protrusions are disposed on two side surfaces of the lower panel 100 which is formed in a square, and two second connection members 150 are disposed on the rest two side surfaces of the lower panel 100 so as to be coupled with the first connection member of the another panel. The first connection member 140 is formed on two side surfaces of the lower panel 100 having a square shape, and a second connection member 150 is formed on the other side of the second connection member 150 to be connected to the first connection member of the other panel. The first connecting member 140 is configured such that the width of the end portion of the protrusion is larger than that of the side getting in contact with the lower panel 100, and the second connection member 150 is configured to fit the shape of the first connection member, so that the lower panels are not separated from each other in the transverse direction when being coupled with each other.

The first connection member 140 and the second connection member 150 may be configured to face each other or to be adjacent to each other.

A first cut groove 160 is provided on the bottom surface of the lower panel 100. The cut groove may be provided at a position where the lower panel 100 is bisected, or may be formed in a cross shape to be divided into four portions. The cut groove is formed so that the lower panel 100 is cut easily without using any tool when necessary. When the heating panel is installed in a space for heating, there is an occasion where the heating panel must be cut out to be used on the wall surface since being out of size. So, the first cut groove 160 allows a user to cut the lower panel 100 into halves or four portions in such a case.

Hereinafter, the bottom surface of the lower panel 100 will be described. The bottom surface of the lower panel having the first guide 110 protruding upward is concavely formed so as to minimize weight of the lower panel 100 and reduce costs. Since the bottom surface of the lower panel 100 is formed concavely, the first guide 110 may be pressed downward and deformed due to a load applied to the lower panel 100. In order to prevent the above, the first fastening member 112 extends from the upper surface of the lower panel 100 to the bottom surface of the lower panel 100. Moreover, a load supporting member 114 is additionally formed in a cross shape around the bottom surface of the first fastening member 112 so as to support the load applied from the upper portion and prevent deformation of the panel even though the bottom surface of the first guide 110 is concave.

Next, the upper panel 200 will be described. The upper panel 200 serves as a cover of the lower panel 100. The upper panel 200 includes: a second air passage 210 corresponding to the first air passage 120 of the lower panel 100; a second fastening member 220 coupled to the first fastening member 112 of the lower panel 100; and a second cut groove corresponding to the first cut groove 160.

The second air passage 210, the second fastening member 220, and the second cut groove are formed on the bottom surface of the upper panel 200 to be located inside the heating panel when the lower panel 100 and the upper panel 200 are coupled.

The second air passage 210 is a lattice-shaped groove formed on the bottom surface of the upper panel 200. As described above, the second air passage 210 is arranged on the same line as the first air passage 120, so that air discharged from the hot water hose can be generally smoothly circulated inside the panel.

The second fastening member 220 protrudes from the bottom surface of the upper panel 200 and is coupled with the first fastening member 112 so that the lower panel 100 and the upper panel 200 are coupled.

Furthermore, the upper panel 200 includes the second cut groove. The second cut groove is located on the same vertical line as the first cut groove 160, and may be disposed at a position where the upper panel 200 is bisected or may be disposed in a cross shape. Therefore, when the lower panel 100 and the upper panel 200 are cut, the lower panel 100 and the upper panel 200 having the same size can be coupled with each other to be used.

In order to do heating work using the present invention, first, the lower panels 100 are laid on the floor with the quantity suitable for the floor area, and then, are coupled with one another using the first connection members and the second connection members of the lower panels 100. Next, the heating hose is fixed to a desired position by using the first guide 110 and the second guide 130, and then the upper panel 200 is coupled to the lower panel 100 by using the first fastening portion 112 and the second fastening portion, thereby finishing the heating work.

As described above, since the heating panel which is installed using the lower panels 100 and the upper panels 200 can adjust the width of the hot water hose to a narrow range, as illustrated in FIG. 5, the lower panels 100 formed in a circular shape are mounted on both sides of the heating area and the lower panels 100 formed in an oval shape are mounted in the middle so that the heating panel installation work can be performed more efficiently.

Since the heating panel according to the present invention uses a cover differently from the conventional dry heating method that a heat transfer plate made of a metal material is laid on a panel, if poly-based resin is used, the heating panel may cause a problem in heating efficiency due to bad thermal conductivity. Therefore, in the case of the heating panel according to the present invention, it is the most important to use materials with excellent heat storage capacity and thermal conductivity, and it is required to use a fire-retardant material to cope with fire. Accordingly, the heating panel according to the present invention is manufactured by using carbon composite materials.

The lower panel 100 and the upper panel 200 of the heating panel according to the present invention are made of the same material, wherein the material is a carbon composite material composed of 50 to 52 wt % of thermoplastic resin, 25 to 30 wt % of a carbon material, 22 to 26 wt % of an inorganic material, and 5 to 8 wt % of maleic anhydride polypropylene (MAPP).

The thermoplastic resin among the materials is at least one selected from resins, such as polypropylene (PP), polycarbonate (PC), polyethylene (PE), etc. The thermoplastic resin promotes mixing of various materials and makes molding easy.

The carbon material is at least one selected from graphite, expanded graphite, carbon fiber, activated carbon, carbon nanotube, graphene, and carbon black. The carbon material improves thermal conductivity and flame retardancy of the heating panel as having high strength, being light, transferring heat and electricity well, and being fire-resistant.

The inorganic material is at least one selected from elvan, gelite, and illite. The inorganic materials, which are minerals of rock, have good heat storage capacity, thereby improving the heat storage performance of the heating panel.

The maleic anhydride polypropylene (MAPP) is a binder and serves as a cross linking agent to couple various materials well.

Next, a process of manufacturing the carbon composite material to manufacture the heating panel according to the present invention will be described. The carbon composite material according to the present invention is completed through a material mixing step, a melting step, a carbon material adding step, an extruding and cooling step, a pellet molding step, and a panel molding step.

First, the material mixing step will be described.

In the material mixing step, 45 to 55 wt % of thermoplastic resin, 15 to 20 wt % of a carbon material, 20 to 25 wt % of an inorganic powder, and 3 to 5 wt % of maleic anhydride polypropylene (MAPP) are stirred and mixed in a stirrer for 20 to 30 minutes.

Next, the thermoplastic resin is melted at temperature of 130° C. to 230° C. which is higher than the melting temperature of the thermoplastic resin so as to be melted. The melting process is performed at a temperature range of 130° C. to 230° C. with temperature intervals of 10° C. in which heating by each temperature interval is performed for 60 to 70 seconds.

In the melting process, 10 to 15 wt % of the carbon material pulverized into 150 to 200 meshes is additionally sprayed to be uniformly dispersed into the thermoplastic resin. The carbon material is at least one selected from graphite, expanded graphite, carbon fiber, activated carbon, carbon nanotube, graphene, and carbon black. Since the carbon material may not be mixed well if being mixed all together in the material mixing step, the carbon material is put in twice.

After that, the carbon composite material is extruded, cooled and cut to make a material in a pellet form. The pellet is heated and injection-molded to complete the heating panel according to the present invention.

The heating panel made through the above processes is easy to construct, and improves heat storage capacity, thermal conductivity, and flame retardancy by using the carbon composite material.

INDUSTRIAL APPLICABILITY

According to the present invention, the heating panel which is manufactured by using carbon composite materials can provide excellent heating efficiency without any thermal conductive medium since having excellent thermal conductivity and heat storage capacity, improve safety from fire as a flame retardant material, and withstand a heavy load due to excellent strength. In addition, the heating panel according to the present invention is easy to construct since having a simple structure.

The invention claimed is:

1. A heating panel comprising:
  a lower panel including:
  a plurality of first guides protruding upward from a bottom surface of the lower panel to form a passage of a heating hose;
  a first air passage formed on the bottom surface and a surface of one of the plurality of first guides; and
  a cross-shaped load supporting member formed on an opposite side of the bottom surface on which the first air passage is formed,
  wherein, the heating panel is made of a carbon composite material composed of 50 to 52 wt % of thermoplastic resin, 25 to 30 wt % of a carbon material, 22 to 26 wt % of an inorganic material, and 5 to 8 wt % of maleic anhydride polypropylene (MAPP).

2. The heating panel according to claim 1, further comprising:
  a plurality of second guides protruding upward from the bottom surface, having the first air passage on the surface thereof, and disposed between the plurality of first guides to form a passage of the heating hose.

3. The heating panel according to claim 1, wherein the lower panel is formed in a square, the lower panel further comprises a first connection member formed to have protrusions on two side surfaces of the square, and a second connection member formed on the other two side surfaces of the square to be coupled with the first connection member, such that a plurality of the heating panels can be coupled with one another.

4. The heating panel according to claim 1, wherein the center of the first guide is formed in a circular or oval shape, and a shape of a top plan view of the first guide is formed in a semicircular or semioval shape.

5. The heating panel according to claim 1, wherein the first guide comprises a hose fixing member which protrudes at a position getting in contact with the heating hose to fix the heating hose.

6. The heating panel according to claim 1, further comprising:
a first fastening member extending from a predetermined position of the first guide to the bottom surface of the lower panel in a columnar shape.

7. The heating panel according to claim 6, further comprising:
a screw-coupling hole formed on the bottom of the first fastening member.

8. The heating panel according to claim 6, wherein the first guide part, which protrudes upward, is formed concavely on the bottom surface of the lower panel, and the cross-shaped load supporting member is formed around the first fastening member.

9. The heating panel according to claim 1, wherein the lower panel further comprises a first cut groove for dividing the panel into two or four parts.

10. The heating panel according to claim 6 further comprising:
an upper panel coupled to the lower panel and including:
a second air passage formed on a bottom surface of the upper panel in a groove form; and
a second fastening member coupled with the first fastening member.

11. The heating panel according to claim 10, wherein the upper panel further comprises a second cut groove for dividing the upper panel into two or four parts.

12. The heating panel according to claim 1, wherein the thermoplastic resin is one or more selected from polypropylene, polycarbonate, and polyethylene resin.

13. The heating panel according to claim 1, wherein the carbon material is one or more selected from graphite, expanded graphite, carbon fiber, activated carbon, carbon nanotube, graphene, and carbon black.

14. The heating panel according to claim 1, wherein the inorganic material is one or more selected from elvan, gelite, and illite.

15. The heating panel according to claim 2, wherein the first air passage is formed by a shallow groove on the bottom surface of the lower panel, the first guide, and the second guide, such that the first air passage is arranged on an entire surface of the lower panel for an air circulation.

16. The heating panel according to claim 10, wherein the first air passage and the second air passage are grooves of a lattice pattern for an air circulation and configured to correspond to positions of each other so that air is circulated through spaces between the first air passage and the second air passage.

* * * * *